Patented May 1, 1951

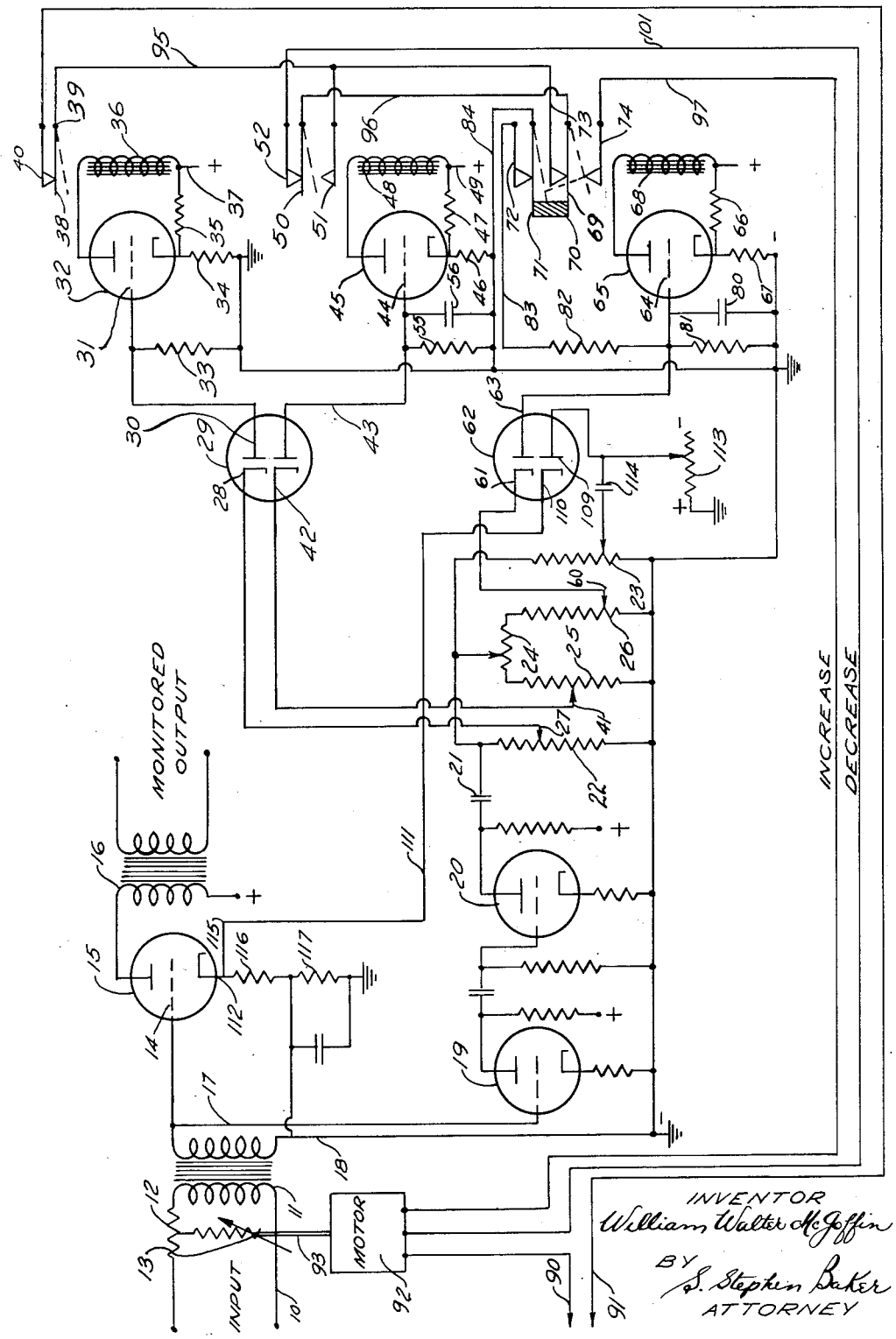

2,551,150

UNITED STATES PATENT OFFICE 2,551,150

AUTOMATIC AUDIO LEVEL CONTROL APPARATUS

William Walter McGoffin, New York, N. Y., assignor of one-fifth to S. S. Baker, New York, N. Y.

Application May 10, 1946, Serial No. 668,817

9 Claims. (Cl. 178—44)

This invention relates to a monitoring apparatus and more particularly to a monitor for regulating the volume range of an electrically transmitted program in radio and audio frequency applications.

Such a monitoring system is particularly used in the modulation of radio transmissions in broadcasting stations where it is essential to maintain the modulation within defined limits. The operator must be constantly on the alert lest loud sounds come in with a blasting or thunderous effect or lest low, soft tones are lost entirely. Automatic volume controls which feed back signals to previous stages so as to vary the amplification factors of those stages are generally undesirable because, among other objections, such operation distorts the signals and adversely affects the quality and naturalness of the program.

Among the objects of this invention is to produce an automatic monitor which preserves the original and desired expression and variance of the program subject and nevertheless maintains its sound level within a predetermined volume range.

Another object of this invention is to produce an automatic monitor which brings up the volume of a low level portion of a program but which will permit a normal fade-out to take place without increasing the level as the fade-out drops below the desired volume range. It is apparent that a fade-out which becomes progressively lower in volume would normally actuate an automatic monitoring system which would in turn commence such corrective action as to destroy the effect of the fade-out and prevent its accomplishment. Such a defect is of considerable importance since it would prevent a natural rendition of the program, particularly in respect to the termination thereof. The present invention, however, is adapted to permit such fade-outs while nevertheless taking effect upon an undesired low level existing in the program.

Another object of this invention is to reduce excessively high levels of sound to the selected maximum level, but to do so at a speed which is somewhat in direct proportion to the excess. Thus, should a particular sound level be excessive, the speed of correction will be high until the level approaches the desired volume range where it will "ease" into the desired volume. Such a procedure is not only advantageous in producing a smoother and less abrupt reduction of sound level to the desired range, but is useful in preventing overswing and possible hunting of the volume range actuating control.

Still another object of this invention is to provide a monitoring system which avoids almost completely the introduction of harmonic distortion into the program or the distortion of wave forms occasioned by peak limiting devices. The monitor further does not electronically amplify hum levels out of further proportion than those already existing between the relative hum and program levels.

According to the instant invention, correction of excessive or inadequate levels is effected by motor actuation of the input volume control. The inertia of the motor operation and the consequent lag of correction is necessarily inherent in such an apparatus. Accordingly, it is still a further object of this invention to provide an immediate correction of undesirable volume levels until the mechanical or motor correction takes effect. The invention also contemplates the removal of the immediate correction means after the desired volume range has been attained through motor control.

Other objects of my invention will be apparent from the following description, it being understood that the above general statements of the objects of my invention are intended to describe and not limit it in any manner.

The drawing is a schematic diagram illustrating a preferred embodiment of the invention. Voice or similar currents as from a microphone or phonograph record pick-up are applied to the input at 10. The currents are fed through the input audio transformer 11 through a conventional pad volume control 12 having a movable arm 13 for adjusting the resistance thereof and regulating the amplitude of the currents fed to the amplifier.

The currents are applied to the grid 14 of thermionic tube 15 which may serve as a preamplifier stage feeding the audio transformer 16, the output of which represents the monitored output. Leads 17 and 18 are brought off the secondary of transformer 11 to the monitoring amplifier comprising the thermionic tubes 19 and 20. The monitoring system provides control signals, as hereinafter described, which automatically compensate for volume deviations by the motor actuation of movable arm 13.

Tubes 19 and 20 are conventional type amplifying tubes which may utilize resistance-capacity or any other desired coupling means. The output of tube 20 is applied through coupling condenser 21 to potentiometers 22 and 23, and through potentiometer 24 to potentiometers 25 and 26. The movable arm 27 of potentiometer 22 applies the amplified voltages to the cathode 28 of one diode section of rectifier tube 29. The rectified audio currents at the plate 30 of the rectifier are then fed to the grid 31 of relay control tube 32. Resistor 33 is of the usual high resistance providing a grid return to ground while resistor 34, which may be in the nature of 1000 ohms, as required, is the usual cathode bias resistor. Resistor 35 is a conventional feed-back resistance to reduce the plate current and adjust the operating point of the relay.

The relay comprises a winding 36 serving as the plate load of tube 32, the positive or plate voltage being applied at point 37 by any suitable direct current power supply system. Armature 38, which is pivoted at point 39, is attracted when sufficient current is flowing through the relay winding 36 and in so doing breaks electrical contact with arm 40, as will hereinafter be described.

Movable arm 41 of potentiometer 25 applies audio currents to the cathode 42 of the other diode section of rectifier tube 29. The rectified audio currents are applied therefrom by plate lead 43 to the grid 44 of tube 45. Tube 45 includes a conventional cathode bias resistor 46 and a feed-back resistor 47. In the particular embodiment shown, the feed-back resistor 47, just as the resistor 35, may be in the order of 50,000 ohms depending, of course, upon the required current flow in the relay winding. The output of tube 45 is fed through the relay winding 48 which thus serves as the plate load resistor, the positive voltage being applied at the point 49. When the relay winding 48 is suitably energized, it will attract armature 50 so as to cause it to contact arm 51. Armature 50 may be of spring metal construction so as to normally maintain a position where it is out of contact with arm 51. Similarly, armature 38 is designed to normally contact arm 40 except when relay winding 36 is sufficiently energized to attract it. When current is not flowing in winding 48 so that armature 50 is in its normal position, it effects electrical contact with arm 52 by virtue of its spring construction.

The input grid 44 of tube 45 is provided with a resistor-condenser time constant network comprising the resistor 55 and condenser 56. As will be hereinafter described, the time constant may be in the order of one second, the elements being chosen to produce this time constant. It will be apparent that the rectified audio currents from lead 43 will be applied to grid 44 while charging up condenser 56. The condenser 56 will thereupon maintain the voltage on grid 44 until its charge leaks off through resistor 55. Thus, a signal which is of sufficient amplitude to cut-off tube 45 so as to discontinue the necessary current for winding 48, will continue its cut-off action even after it has dropped below the necessary level, such action being maintained for the time-constant period represented by the condenser 56 and resistor 55.

Movable arm 60 of potentiometer 26 applies audio currents to the cathode 61 of one diode section of rectifier tube 62. The rectified output of the tube is fed from plate lead 63 to the grid 64 of tube 65. The feed-back resistor 66 and cathode bias resistor 67 may be similar to those of the preceding relay control tubes. When relay winding 68 is suitably energized, it attracts armature 69 which is connected by an insulating post 70 to armature 71. In the normal position of the armatures when they are not attracted by the winding 68, armature 71 makes electrical contact with arm 72, while armature 69 makes electrical contact with arm 73. When, however, the relay winding is energized, the armature 69 effects electrical contact with arm 74, while armature 71 is brought away from arm 72 so as to break contact therewith.

The grid 64 of tube 65 is provided with a time-constant network comprising the condenser 80 and the resistor 81. The rectified currents from tube 62 produce a negative voltage on grid 64 which is held over by virtue of the charge on condenser 80 so that should this voltage fall below the level required to cut-off the tube 65, the tube will nevertheless remain cut-off for a period of time represented by the time-constant in the grid circuit.

Resistor 82 is connected through lead 83 to arm 72. In the normal or de-energized position of the relay controlled by tube 65, the armature 71 contacts arm 72 and is connected through lead 84 to ground. It will therefore be apparent that resistor 82 is thereby brought into an electrical parallel relationship with resistor 81 so as to reduce the time-constant of the grid circuit. The time-constant of the resistor 81 and condenser 80 may be in the order of one second and resistor 81 may be either one or two megohms or the like in the time-constant combination. Resistor 82, however, may be considerably smaller, such as 2000 ohms, for example, so as to permit the charge on condenser 80 to be rapidly dissipated whereupon the hold-over time on grid 64 will be considerably shortened. It will be recognized therefore that when the output of tube 62 is such as to cut off the tube 65, and de-energize the relay winding 68, the time-constant is reduced so as to render the corrective action of the relay more synchronous with the exciting signals. As will be hereinafter explained, the synchronism thus established produces fast corrective action with highly excessive signals and slow or "eased" action with slightly excessive signals.

The foregoing monitor amplifier and relay network, control the application of operating current from electrical power leads 90 and 91 to the reversible motor 92. The shaft 93 of motor 92 is connected to the movable arm 13 of the input volume control. Means are provided to operate motor 92 in either direction so as to actuate the volume control and increase or decrease the amplitude of the signal applied to input audio transformer 11. The motor operation is, in turn, controlled by the contact positions of the relays of tubes 32, 45 and 65.

When the apparatus is operating through the application of operating voltages to the plates and cathodes of monitoring amplifier tubes 19 and 20 and relay control tubes 32, 45 and 65, and in the absence of an audio signal applied through the leads 17 and 18, the relay windings 36, 48 and 68 are energized and their armatures drawn to the core. Thus, the relays are ordinarily energized unless a cut-off signal is produced by the tubes 19 and 20, and the rectifier tubes 29 and 62. When the rectified audio voltages applied to the grids 31, 44 and 64 are sufficient, the relays in the respective plate circuits are de-energized and their armatures spring back to their normal unattracted positions. When the armature 38 is thus released, it effects contact with arm 40. Assuming now that the voltages applied to grids 44 and 64 are insufficient to de-energize the relay windings 48 and 68, the electric current from lead 91 will actuate the motor 92 for volume increase through the following circuit.

The current will flow through arm 40, armature 38, lead 95, arm 51, armature 50, lead 96, armature 69, lead 97, to the motor 92. The motor will then be operated in a predetermined direction and the volume will thereupon be increased until the rectified audio voltage applied to grid 44 of tube 45 is sufficient to de-energize the relay winding 48 and release the armature 50. This will break the electrical circuit to the motor 92 since the lead 95 is connected to the arm 51 which no longer contacts the armature 50 so that the circuit will be broken at that point. Accordingly operating current to motor 92 is cut off and the volume remains set. Thus, the relay control tube 32 is effective in bringing up the volume to a predetermined level which is sufficient to de-energize the relay winding 48 of tube 45 and discontinue the volume increase. The setting of these levels is adjustable according to the desired conditions of volume control, as will be hereinafter set forth.

Should the amplitude of the input currents exceed a predetermined volume range, the rectified audio voltage applied to the grid 64 of tube 65 will cause relay winding 68 to become de-energized so as to release the armatures 71 and 74. The motor 92 will then be actuated so as to decrease the volume by the following electrical circuit: Electrical current will flow through lead 91 to arm 40, to armature 38, through lead 95, to lead 100, to arm 73, to armature 74, through lead 96, to armature 50, to arm 52, through lead 101, to the motor 92, so as to operate it in reverse and decrease the volume. The lead 90 represents the common lead for operating power to the motor 92.

It will be apparent from the foregoing that the de-energization of relay winding 36 is first effected so that at a specific volume level necessary to cut-off tube 32, the motor can be actuated in either direction depending upon whether the signal has further attained an amplitude sufficient to de-energize relay winding 48 or whether it is of such high level as to de-energize relay winding 68. Thus, the invention is concerned with three volume levels of operation, the first level being that which releases armature 38 so as to permit either of the two relays to operate, and the other two being the levels at which the relay windings 48 and 68 release their armatures, the operation of either one of said relay windings excluding operation by the other.

The setting of potentiometer 22 determines the operating point or signal strength at which voltage will be potentially applied to the motor through the contacts 38 and 40. Potentiometer 22 will ordinarily be set so as to exclude the effect of background noise levels or hum and will produce de-energization of relay winding 36 at a suitably low level of voice currents. Potentiometer 25 sets the level at which relay winding 48 will release its armature 50 and defines the beginning of the volume width or range within which the signals or currents should be confined.

Potentiometer 26 sets the level at which relay winding 68 will release the armatures 70 and 74, and thus defines the end or outer limits of the volume range within which the currents should be confined. Potentiometer 24, however, determines the relative resistance ranges of potentiometers 25 and 26 and is therefore capable of adjusting the spacing between the operating points of relay windings 48 and 68. Summing up therefore the operation of the foregoing potentiometers, potentiometer 22 which may be in the order of one megohm, sets the minimum signal level at which corrective action occurs. Potentiometer 25, which may be in the order of 500,000 ohms, sets the beginning of the tolerable volume range, while potentiometer 26 of approximately the same ohmage sets the end level of the range. Potentiometer 24 which is of considerably less resistance, simultaneously affects both volume levels so as to regulate the width of the volume range.

The settings and operation of the potentiometers and relays to attain the desired objectives will be hereinafter set forth in greater detail. However, assuming now that the proper settings have been made, the foregoing system will produce such motor action as to correct for deviations from a desired volume range.

It is apparent, however, that the mechanical or physical action of the motor necessarily lags behind the electrical controls which are actuating it. Accordingly, means are provided which produce a substantially instantaneous correction signal until the motor has performed its function. Such means are provided in the second diode section of rectifier tube 62. Potentiometer 23 sets the point of such instantaneous response and applies the currents to the second diode section. The rectified audio voltage produced in the cathode 110 thereof is applied by lead 111 to the cathode 112 of tube 15.

Potentiometer 113 is utilized in applying a fixed direct current potential or bias to the second diode section of tube 62 so that audio voltages through condenser 114 must exceed this bias level before corrective action will be taken. Resistors 116 and 117 may be in the order of 1000 ohms and 30,000 ohms respectively as is conventional in standard compressor circuits. In the instant invention, however, the usual compression amplifier is dispensed with and the rectified audio voltage as applied by lead 111 performs this function. The rectified audio voltage from cathode 110 does not effect compression in tube 15 until the voltage applied to the anode 109 exceeds the fixed bias supplied by potentiometer 113. When this point, which is the selected maximum level, is reached, the rectified audio voltage exceeds the fixed bias of potentiometer 113 and a commensurate, instantaneous electronic correction is made to hold the audio level to the selected maximum limit by electronically decreasing the output of tube 15 in proportion to the volume excess. However, this does not affect the input to the monitoring amplifier through leads 17 and 18. Simultaneously therewith, the excessively high input currents are applied to the relay system so that the motor 92 is energized accordingly. When the motor 92 corrects for such deviation, the compression signal is removed from tube 15.

My invention as regards the setting of potentiometers and the predetermination of the desired volume width is operated as follows:

Since the voltage across potentiometer 22 will be a function of the intensity of the audio currents, the movable arm 27 will be set so that a threshold level of intensity or amplitude will be taken off so as to produce cut-off in tube 32 and consequent de-energization of its relay winding 36. At this threshold level, armature 38 will be released so as to increase the volume input to the amplifier. When the level reaches the amplitude necessary to cut off tube 45 as determined by the setting of potentiometer 25, the circuit to the motor will be broken and the volume will remain set. Tube 65 is, however, so operated that a higher level of operation is necessary to cut it off and to effect a decrease of volume. The level between which tube 45 and tube 65 cuts off determines the width within which no volume correction will be made. Thus, potentiometers 25 and 26 determine the levels above threshold level where the motor 92 is either stopped or actuated in reverse to decrease the volume. These potentiometers will, therefore, be set according to the desired intensity of levels while potentiometer 24 will be set according to the desired volume width.

It will be seen from the foregoing that an electromechanical system has been provided which automatically maintains the audio currents within a desired range while being insensitive to the ordinary low level of background noise. Such correction is achieved without affecting the quality and fidelity of audio currents when they are within the desired range. The system permits the pre-amplifier and other tubes to operate along a desired and pre-determined portion of their characteristic curves so as to avoid distortion of the currents. In addition, an instantaneous electronic correction is provided for the purposes set forth hereinabove.

It is desirable to avoid erratic action of the motor control system such as would result from momentary operation of the relay windings 48 and 68 during a series of voltage peaks above the maximum level. The time-constant networks in the grid circuits of tubes 45 and 65 permit the condensers 56 and 80 respectively to average the volume peak voltages by retaining their charges for a fraction of time thereby producing effective operation of relay windings 48 and 68 only on the average volume changes. In other words, one peak will not operate the relay windings because due to inertia and motor lag, the charges on the condensers 56 and 80 would leak off before the motor was operated. On a series of peaks, however, the condensers average the voltages and produce corrective action through motor operation.

In the rendition of musical programs, a very common portion thereof is the fade-out or "segue." While manual operation can take such fade-outs into account by neglecting to bring up the gain on such portion, an automatic system cannot ordinarily distinguish between a fade-out and a drop in level which should be corrected. It will be recognized that should the gain be brought up at that point, the effect of the fade-out would be lost and the merits of the automatic monitor would be seriously limited in this direction. The present invention, however, provides means whereby the apparatus will permit a true fade-out to occur, but will bring up the volume should the "fade-out" level off or increase in volume, whereupon it would, of course, not be a true fade-out and should be corrected as to volume intensity.

Such discrimination is produced between the operating points of tubes 32 and 45 or by the points between the threshold or low point level at which correction takes place and the commencement of the pre-determined volume width.

Since the condenser 56 maintains a charge on the control grid 44 of tube 45 for a length of time depending upon the time-constant network of which it is an element, the tube 45 will remain cut off while the fade-out signal is descending below the level required to cut off tube 32 or institute corrective action. It will be apparent that if the distance between the operating points of relay windings 36 and 48 can be traversed by the signal before a condition obtains wherein relay winding 48 is energized while relay winding 36 is de-energized, no increase of volume will be effected because at that time the signal has already descended into the low levels where the apparatus is unresponsive.

The character of the fade-out may be controlled by adjusting the operating point between the levels controlled by the de-energization of relay windings 36 and 48 since the time-constant network will take effect depending upon the distance between these levels. On the other hand, the character of the fade-out which may be served by the apparatus can be controlled by revising the time-constant network in the grid circuit of tube 45. If the time-constant is made larger, longer fade-outs will be permitted. In order to provide adjustability thereof, a series of condensers of varying capacities may be switched in as desired in the grid circuit of grid 44 so as to change the time-constant accordingly.

The instant apparatus also provides means whereby currents of excessive intensity are eased rather than abruptly brought down to the desired volume range. Abrupt operation of this nature would not only affect the naturalness of the rendition but might produce overswing by the motor 92 and consequent hunting or other erratic operation. Accordingly, a resistor 82 is arranged to be shunted across time-constant resistor 81 so as to reduce the time-constant in the grid circuit of tube 65. Each time that relay winding 68 releases its armatures, contact 72 meets armature 71 so as to place the resistor 82 across the condenser and rapidly dissipate the charge thereon. If the volume is still too high, the relay winding 68 again releases the armature 71 and the operation is repeated. This causes the relay to vibrate rapidly when the volume is only slightly higher than the selected maximum level and the motor is thereby actuated in pulses so as to ease the volume to the proper level. If, however, the volume is very high, resistor 82 will not dissipate the charge as fast as it is fed to condenser 80 and relay winding 68 will remain released so as to operate the motor at maximum speed until the volume drops to the level where relay winding 68 commences its vibrating operation to ease the volume control system to reduce the signal to the proper maximum level.

It will also be understood that a somewhat similar "easing" or motor insensitivity to random operation is effected on the minimum levels when the rising level of the audio peaks first releases armature 36 and then armature 50 until a level is reached where the holdover time of condenser 56 on relay winding 48 prevents the winding 48 from pulling in the armature when random descents below the operating level of tube 45 are encountered.

The foregoing apparatus in its entirety provides an electrically operated automatic control that does not merely perform the functions of a human agency, but offers such precision, accuracy, and delicacy of control which is not possible to achieve by manual operation. It is not subject to either inertia or fatigue and can perform instantly, smoothly and with complete reliability in maintaining the volume within definite and strict limits above a predetermined minimum level, an accomplishment which is of practical impossibility as far as human control is concerned.

I have shown a preferred embodiment of my invention, but it is obvious that numerous changes and omissions may be made therefrom without departing from its spirit. For example, while I have illustrated the correction of volume deviating or departing signals as being effectuated by the actuation of the input control arm 13, many of the advantages of this invention may be realized by corrective measures, either electronic or mechanical, taken in any suitable point in the signal transmitting system such as at the tube 15 or in the amplifier fed by the monitored output. Thus, the advantages of maintaining the sound volume within the limits described without in any way correcting the signals unless they are outside of those limits, may be realized by causing such outside signals to control the signal volume at any point in the apparatus.

I claim:

1. A sound control system comprising an input circuit for applying input signals to an electrical apparatus, controlled means for regulating said input circuit so as to vary the amplitude of the input signals applied to said apparatus, a source of electrical current for said controlled means, thermionic tube means and a plurality of relays controlled thereby for controlling the application of said electrical current to said controlled means so as to adjust the amplitude of said input signals according to their departure from within a predetermined amplitude range and above a threshold level of amplitude, said predetermined amplitude range being spaced above said threshold level whereby input signals between said threshold level and said predetermined amplitude range are adjusted so as to rise within said range, and means to render said thermionic tube means and relay system insensitive to a progressive amplitude decrease of an input signal from said predetermined amplitude range to below said threshold level whereby a fading signal may traverse the space between said predetermined amplitude range and said threshold level without being adjusted, said means to render said thermionic tube means and relay system insensitive comprising a time constant network in said thermionic tube means and means to apply a cut-off biasing potential to said time constant network so as to suspend operation of said thermionic tube means for the duration of said time constant.

2. A sound control system comprising an input control for applying an input signal to an electrical apparatus, reversible motor means for actuating said input control so as to vary the amplitude of input signals applied to said apparatus, a source of electrical current for said motor means, a plurality of relays for controlling the application of said current to said motor means, thermionic tube means associated with each of said relay means to control the operation thereof, input signal rectifiers feeding each of said thermionic tube means, each of said thermionic tube means being so operated as to respond to progressively higher amplitudes of rectified input signals, a first of said relays and thermionic tube means associated therewith being responsive above a predetermined minimum level of input signals so as to operate said motor means in a forward direction so as to increase the amplitude of the input signals, a second and third of said relays being respectively responsive to higher predetermined input signal amplitudes defining a desired volume width so as to maintain signals above said predetermined minimum level within said volume width, said second relay means being operative to discontinue the application of electrical current to said motor means when the amplitude of input signals is within said volume width, said third relay means being operative to apply electrical current to said motor means so as to reverse its operation when input signals exceed said desired volume width, a time constant network in the thermionic tube means controlling the second of said relays so as to permit a fading signal to traverse the space between said volume width and said predetermined minimum level without affecting the application of electrical current to said motor means and a time constant network in the thermionic tube means controlling said third relay for accumulating rectified input signals and operating said third relay on average levels thereof, said time constant in the third relay thermionic tube circuit being automatically decreased in the operation of said third relay.

3. A sound control system according to claim 2 including means to adjust the levels of response of each of said thermionic tube means, and means to jointly adjust the responsive levels of the thermionic tube means associated with said second and third relays whereby the operating levels of said input control actuation and said desired volume width may be set.

4. A sound control system comprising an attenuating input circuit for applying an input signal to an electrical apparatus, means to vary the attenuation of said input circuit so as to vary the amplitude of the input signal applied to said apparatus, said means to vary including a relay for controlling the attenuation characteristics of said input circuit, thermionic tube means to control the operation of said relay, said thermionic tube means being so operated as to respond to input signals above a predetermined minimum level whereby said attenuation varying means is operated through said response to control said input circuit and increase the amplitude of said input signal, means to discontinue the operation of said attenuation varying means when a first predetermined level of desired amplitude is reached, and means to operate said attenuation varying means to decrease the amplitude of said input signal when a second predetermined level of desired amplitude is exceeded, and a time constant network in said thermionic tube means for continuing said response thereof to signals after such signals have passed, and means to adjust the amplitude difference between said predetermined minimum level and said first predetermined level of desired amplitude whereby fading signals of varying characteristics may be enabled to descend from said first predetermined level to below said predetermined minimum level without affecting said response.

5. A sound control system comprising an input circuit for applying an input signal to an electrical apparatus, controlled means for varying the operation of said input circuit so as to vary the amplitude of input signals applied to said apparatus, a source of electrical current for said controlled means, a plurality of relays for controlling the application of said current to said controlled means, thermionic tube means associated with each of said relays to control the operation thereof, each of said thermionic tube means being so operated as to respond to progressively higher amplitudes of input signals, a first of said relays and thermionic tube means associated therewith being responsive above a predetermined minimum level of input signals so as to adjust said controlled means so as to increase the amplitude of the input signals, a second and third of said relays being respectively responsive to higher predetermined input signal amplitudes defining a desired volume width so as to maintain signals above said predetermined minimum level within said volume width, said second relay being operative to discontinue the application of electrical current to said controlled means when the amplitude of input signals is within said volume width, said third relay being operative to apply electrical current to said controlled means so as to effectively reverse its operation when input signals exceed said desired volume width, and potentiometer controls for setting the levels of operation of the first, second and third relays, and a common control for simultaneously adjusting the levels of the second and third relays whereby the spacing between them or the volume width may be set.

6. A sound control system according to claim 5 including an input signal rectifier for each thermionic tube means controlling each of said relays, a first time constant network in the thermionic tube means controlling said second relay so as to hold over input signals for a predetermined time, a second time constant network in the thermionic tube means controlling said third relay for accumulating rectified input signals thereon, and means for altering the time constant of said third relay when the thermionic tube controlling said relay responds to input signals, said alteration of time constant being adapted to dissipate its accumulated charge rapidly whereby said third relay operates intermittently as it approaches said desired volume range and operates constantly in ranges high above said desired volume range.

7. A sound control system comprising an input control for applying an input signal to an electrical apparatus, means to vary the operation of said input control so as to vary the amplitude of the input signal applied to said electrical apparatus, means automatically responsive to signals outside of a predetermined amplitude range for varying said input control so as to adjust the amplitude of said input signal according to its departure from within said predetermined amplitude range, and a control network for varying said input control at a rate substantially in relation to the excess of an input signal above said predetermined amplitude range whereby said input control is varied abruptly for greatly excessive amplitudes of input signals and is varied relatively slowly for such input signals as they approach said predetermined amplitude range so as to ease the signals into said amplitude range, said control network comprising a relay circuit, a condenser in said relay circuit and effectively charged by said input signals, and alternatively effective resistances for alternatively providing slow and fast discharge paths for said condenser, said resistances being alternatively selected by the operation of said relay circuit.

8. A control system comprising an input control for applying an input signal to an electrical apparatus, adjusting means for regulating said input control so as to vary the amplitude of the input signal applied to said electrical apparatus, and a control network automatically responsive to signals on both sides of a predetermined volume range for operating said adjusting means and regulating said input control thereby, said adjusting means being operable by said control network according to the direction of departure of input signals from said predetermined volume range whereby said input signals are automatically varied to within said volume range by the regulation of said input control, said network being operative to actuate said adjusting means continuously when the amplitude of input signals greatly exceeds said predetermined volume range and being operative to actuate said adjusting means intermittently as said input signals approach said predetermined volume range whereby said input signals are eased into said predetermined volume range.

9. A sound control system for correcting the amplitude of sound signals comprising adjusting means for varying the amplitude of input signals, a plurality of relays controlling the operation of said adjusting means, thermionic tube means associated with each of said relays so as to control the operation thereof, each of said thermionic tube means being so operated as to respond to progressivly higher amplitudes of input signals, a first of said relays and thermionic tube means associated therewith being responsive above a predetermined minimum level of input signals so as to operate said adjusting means to increase the amplitude of the input signals, a second and third of said relays being respectively responsive to higher predetermined input signal amplitudes defining a desired volume width so as to maintain signals above said predetermined minimum level within said volume width, said second relay being operative to discontinue the adjusting of said input signals when their amplitude is within said volume width, said third relay controlling said adjusting means so as to effectively reverse its operation when input signals exceed said desired volume width, and a common control for the tube means of said second and third relays for simultaneously adjusting their operating levels whereby the effective spacing between them or effective volume width may be set.

WILLIAM WALTER McGOFFIN.

REFERENCES CITED

The following references are of record in the file of this patent:

UNITED STATES PATENTS

| Number | Name | Date |
|---|---|---|
| 1,447,773 | Espenschied et al. | Mar. 6, 1923 |
| 1,697,905 | Deardorff | Jan. 8, 1929 |
| 2,284,102 | Rosencrans | May 26, 1942 |
| 2,404,160 | Boucke | July 16, 1946 |